United States Patent

Mayne

[11] Patent Number: 5,875,755
[45] Date of Patent: Mar. 2, 1999

[54] LOW COMPRESSION RATIO INTERNAL COMBUSTION ENGINE

[75] Inventor: Alfred Rickard Mayne, Arundel, Australia

[73] Assignee: Split Cycle Technology Limited, Australia

[21] Appl. No.: 687,532

[22] PCT Filed: Nov. 24, 1995

[86] PCT No.: PCT/AU95/00787

§ 371 Date: Jul. 24, 1996

§ 102(e) Date: Jul. 24, 1996

[87] PCT Pub. No.: WO96/17160

PCT Pub. Date: Jun. 6, 1996

[30] Foreign Application Priority Data

Nov. 25, 1994 [AU] Australia ............................. PM9673
Feb. 9, 1995 [AU] Australia ............................. PM0979

[51] Int. Cl.$^6$ ............................. F02B 41/02; F02B 75/32
[52] U.S. Cl. ....................... 123/253; 123/54.3; 123/197.1
[58] Field of Search .................. 123/39, 54.3, 197.1, 123/197.2, 253, 304, 197.4, 55.3, 56.2, 56.7, 56.8, 56.9

[56] References Cited

U.S. PATENT DOCUMENTS

| 326,562 | 9/1885 | Hopkins et al. | 123/39 |
| 1,054,615 | 2/1913 | Rauch | 123/39 |
| 3,687,117 | 8/1972 | Panariti | 123/197.1 |
| 4,140,090 | 2/1979 | Lindberg | 123/277 |
| 4,211,190 | 7/1980 | Indech | 123/197.4 |
| 4,459,945 | 7/1984 | Chatfield | 123/55.3 |

FOREIGN PATENT DOCUMENTS

| 1115147 | 5/1968 | United Kingdom . |
| 2050509 | 1/1981 | United Kingdom . |
| 33443-701 | 6/1986 | United Kingdom . |
| WO 95/08696 | 3/1995 | WIPO . |

*Primary Examiner*—Andrew M. Dolinar
*Attorney, Agent, or Firm*—Jones & Askew, LLP

[57] ABSTRACT

A low compression ratio internal combustion engine with extended dwell at or near piston top dead center to facilitate substantially complete combustion providing a higher engine output power. A pre-combustion chamber passes high temperature and pressure combustion products into the cylinder of the engine.

9 Claims, 3 Drawing Sheets

LOW COMPRESSION RATIO INTERNAL COMBUSTION ENGINE

TECHNICAL FIELD

The present invention relates to rotary machines and more particularly to internal combustion engines having linear piston motion producing a rotary output.

BACKGROUND ART

This invention is related to developments by the present applicant in connection with International Patent Applications PCT/AU89/00275; PCT/AU91/00244; PCT/AU94/00529and PCT/AU94/00569 the contents of which International patent applications are incorporated herein by reference and nominated as split-cycle arrangements. By employing lobed shafts as the means of transmission of linear piston motion to rotary output motion a wide range of varying piston motions can be achieved simply by varying the shape of the lobes. A particular advantage arises in that by appropriate designing of the profiles of the lobes on the shafts the pistons can be controlled in such a manner as to vary their dwell time at any position between top dead center and bottom dead center as well as at those limits of piston motion.

A particular advantage arises where the piston dwell time is extended at its top dead center position to facilitate combustion of the fuel charge while the piston remains at that location to enable maximum energy transmission to the piston and thereby achieve the best possible conversion of combustion energy to engine output power and torque.

In previous disclosures rotary machines of this form have contemplated the use of 50 mm diameter pistons having a 6 mm stroke. Typically the combustion chamber being the volume above the piston at top dead center within the cylinder and head of the engine or machine, has been sized at 2 mm high with a 50 mm bore.

With a 50 mm diameter piston and a 6 mm stroke the swept volume is approximately 11.8 cc for each cycle of motion of the piston while the head volume of the cylinder with the piston at top dead center is approximately 4000 cubic millimeters. The effective cubic capacity of the cylinder is, eg. 10.3 cc. being the swept volume of the cylinder after closing of the exhaust port slit in the cylinder's sidewall as the piston travels toward TDC.

DISCLOSURE OF INVENTION

Conventional engine technology leads to a combination of an oversquare engine design coupled with a high compression ratio in order to achieve improved engine output while the present inventive development has found that by reducing the compression ratio coupled with an appropriately designed dwell time at top dead center an improved engine output call be achieved. The dwell time is readily modified by varying the shape of the lobes on the lobed shafts of the split cycle engine.

In one example where the compression ratio was changed from 4 to 1 to 1.75 to 1 a marked increase in engine performance was achieved.

In the case of an embodiment with a 50 mm diameter piston and a 6 mm stroke with a 2 mm high combustion chamber it was varied so as to provide an 8 mm high combustion chamber at top dead center the compression ratio had thereby changed from 4.1 to 1.75 to 1 which was coupled to a dwell at top dead center equivalent to 72° of crank rotation in a conventionally cranked engine. In this embodiment a marked increase in engine performance was achieved.

An analysis of the described embodiment shows that the volume of fuel and air charge in the lower compression ratio engine provided a charge volume at the top dead center of approximately 16,000 cubic millimeters with a compression ratio of 1.75 to 1 as compared with 4000 cubic millimeters in the engine with a compression ratio of 4 to 1 while the cylinder pressure at top dead center was reduced from 80 pounds per square inch for the 4 to 1 compression ratio engine to 50 pounds per square inch for the engine with a 1.75 to 1 compression ratio. The ratio of the charge volume for the 1.75:1 compression ratio engine to that of the 4:1 engine is 7:4 being the ratio of the combined cylinder and head volumes with their pistols at bottom dead center.

An analysis of the functional operation of the differences between these versions shows that considerably more fuel energy is supplied per firing of the lower compression ratio engine as compared to that with the higher ratio and provided that the additional fuel energy is efficiently converted to apply force to the piston then a greater torque is achieved at the engine output shaft than from the higher compression ratio engine.

The present invention has established that by a combination of control of the piston dwell time during combustion of the fuel charge a substantial lowering of the compression ratio relative to that of conventional cranked piston engines results in a previously unanticipated increase in engine torque.

The range of compression ratios contemplated by the present invention is from 1:1 to 4:1 in the environment of an internal combustion engine constructed in accord with the invention disclosed in one or more of our aforementioned International patent applications.

A low compression ratio engine of the first aspect of the invention enables improved power output from the engine but the lack of a squish effect due to low compression and lack of turbulence requires extended dwell of each piston at top dead centre for a complete burn of each fuel charge.

To control combustion more effectively and achieve a substantially complete burnout of each fuel charge it is preferred to mount a high intensity conmbustor adjacent each cylinder to take either a full or partial fuel/air charge to be ignited to drive the piston.

In another aspect the present invention contemplates a low compression engine of the kind described above comprising a high intensity combustor having a combustion volume adjacent each cylinder of the engine wherein a fuel/air mixture of a combustible charge is ignited in the combustion volume so that the charge expands into the cylinder as it burns within the combustion volume to apply pressure to the piston within the cylinder.

Combustion in the combustion volume of the high intensity combustor commences slowly as expected under low compression conditions and intensifies during the piston dwell at TDC. As the piston moves away from TDC the combustion gases expand into the cylinder through a venturi increasing velocity and turbulence of those gases. The speed of the flame front increases and substantially complete combustion is achievable.

In an embodiment of this aspect, stratified charges may be added to the cylinder housing the piston. Such charges could include such as a low grade fuel and air mixture, atomised water or excess air or other additives as understood by those skilled in the art.

The present invention has determined that by a combination of control of the piston dwell time during combustion of the fuel charge and a substantial lowering of the compression ratio relative to that of conventionally cranked piston engines there arises a previously unanticipated increase in engine torque.

BRIEF DESCRIPTION OF DRAWINGS

The present invention will now be described by way of example with reference to the accompanying drawings, in which.

BEST MODES

Figure 1:
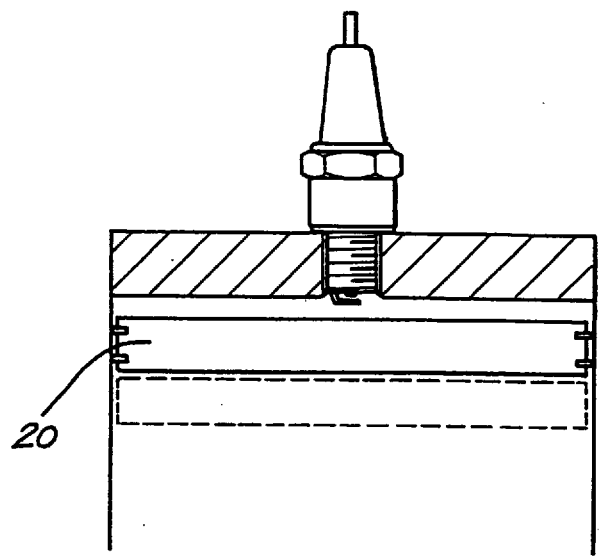
FIG. 1 is a schematic cross-sectional view of single cylinder-piston of an existing engine of the type with which the present invention is concerned.
Figure 2:
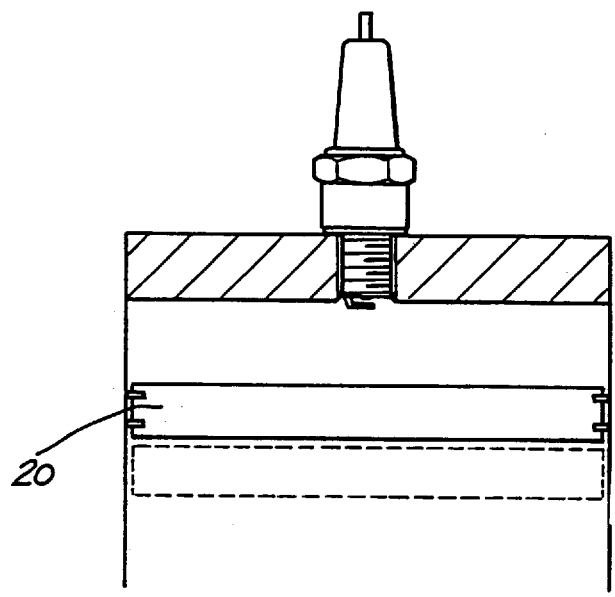
FIG. 2 is a schematic cross-sectional view similar to FIG. 1 but configured with a compression ratio in accord with the present invention.

In both FIGS. 1 and 2 the piston 20 drawn in solid lines is shown at TDC while that in dashed lines is the piston at BDC. The stroke of the piston 20 in FIGS. 1 and 2 is the same at 6 mm and the cylinder wall slit ports for intake and exhaust have not been depicted.

Figure 3:
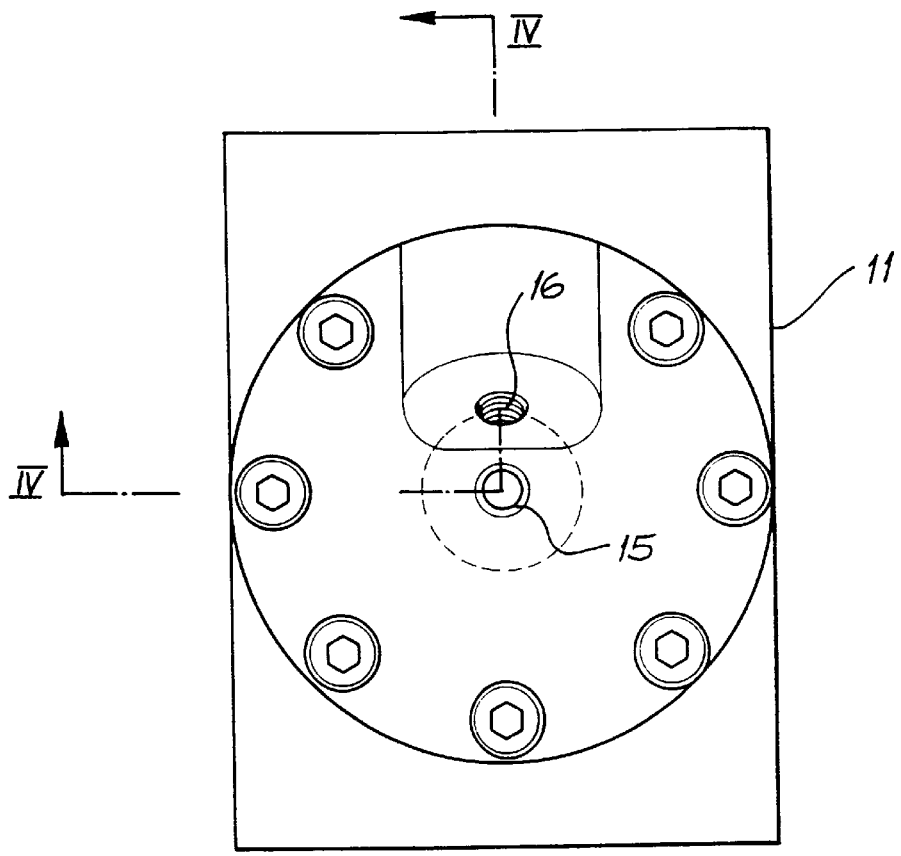
FIG. 3 is a plan view of the head of an engine in accord with an embodiment of a second aspect of the invention.
Figure 4:
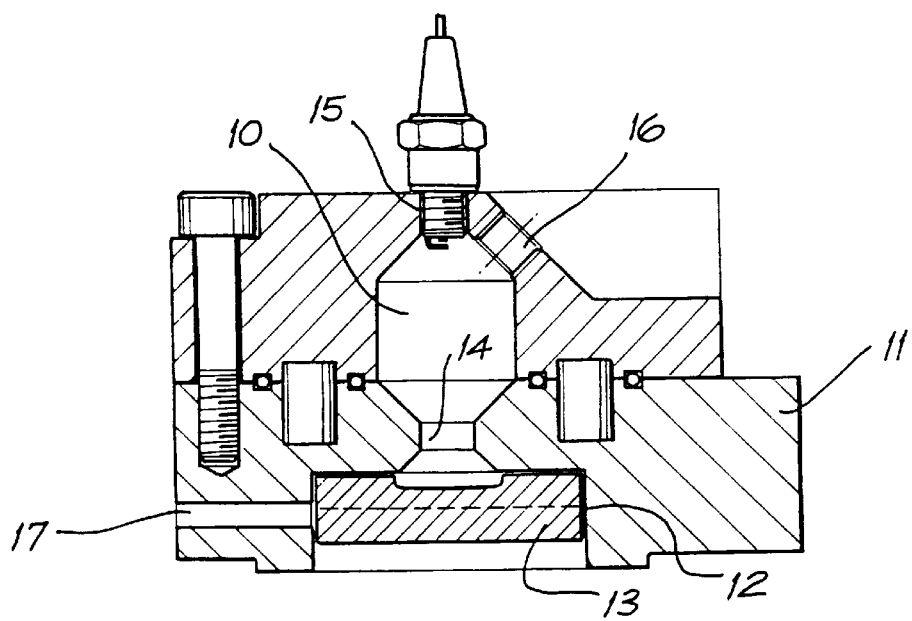
FIG. 4 is a radial cross-sectional view IV—IV of the head and upper cylinder of FIG. 3.

In the embodiment of FIGS. 3 and 4, a high intensity combustion chamber having a combustion volume 10 is mounted atop head 11 and is connected with the cylinder 12 housing piston 13 via venturi 14. Pressurised fuel and air is injected into volume 10 via passage 16 while a spark plug is mounted to volume 10 via threaded bore 15. Cylinder 12 contains an exhaust slit 17.

Figure 5:
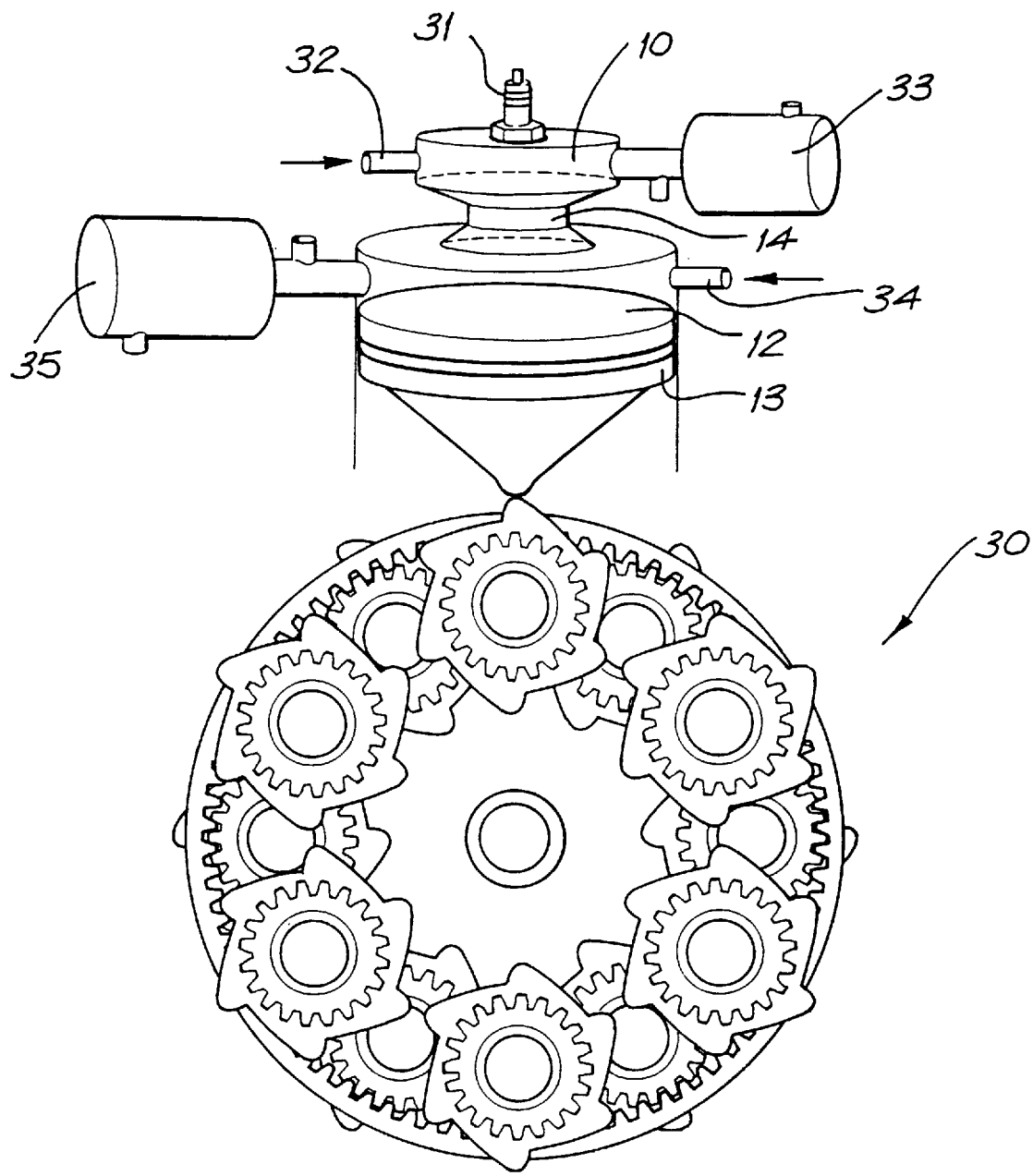
FIG. 5 is a pictorial representation of another embodiment of the second aspect of the present invention.

FIG. 5 is a schematic representation of another embodiment of the second aspect of the invention where like parts are similarly numbered to their equivalents in FIGS. 3 and 4. The operation of this embodiment which shows a piston 13 and cylinder 12 mounted to a split cycle linear to rotary power transmitter 30 is similar to FIG. 4 with high intensity combustion chamber volume 10 being fitted with a spark plug 31 and fed with supercharged air via inlet 32 and fuel via injector 33.

Upon ignition of a relatively low flash point fuel, such as gasoline fed by injector 33 into volume 10 the flame front and burning mixture passes through venturi 14 into cylinder 12. Cylinder 12 is charged with a larger charge of a lower grade, higher flashpoint fuel via injector 35 and supercharged air via inlet 34 at, say, 20 psi. That charge of lower grade fuel, such as diesel, is ignited by the burning mixture entering via venturi 14. Such an arrangement enables low grade fuels to be burnt at low compression ratios while still achieving substantially complete combustion.

It will be appreciated by persons skilled in the art that numerous variations and/or modifications may be made to the invention as show in the specific embodiments without departing front the spirit or scope of the invention as broadly described. The present embodiments are, therefore, to be considered in all respects as illustrative and not restrictive.

I claim:

1. In a split cycle internal combustion engine having a plurality of pistons reciprocable within corresponding cylinders and having an extended piston dwell at the top dead center, the improvement comprising each piston and cylinder having a bore and stroke operative to provide a compression ratio in the range of greater than 1:1 to 4:1.

2. An engine as claimed in claim 1, wherein a combustible mixture is fed to cylinders of the engine under pressure greater than atmospheric.

3. An engine as claimed in claim 2, comprising a high intensity combustor adjacent each cylinder of the engine, each said combustor being adapted to feed combustion products to a respective cylinder.

4. In an engine as claimed in claim 3, wherein compressed air is fed into each cylinder as part of the fuel/air mixture.

5. An engine as in claim 1, comprising a high intensity combustor adjacent each cylinder of the engine, each said combustor being adapted to feed combustion products to a respective cylinder.

6. An engine as claimed in claim 5, wherein the combustion products from each high intensity combustor are fed into each respective cylinder to ignite a fuel/air mixture of which the fuel is of a lower grade, higher flashpoint than the fuel ignited in the high intensity combustor.

7. An engine as claimed in claim 6, wherein compressed air is fed into each cylinder as part of the fuel/air mixture.

8. An engine as claimed in claim 5, wherein combustion products from each high intensity combustor are fed into each respective cylinder to ignite a fuel/air mixture of which the fuel is of a lower grade, higher flashpoint than the fuel ignited in the high intensity combustor.

9. An engine as claimed in claim 1, wherein the dwell of each piston at top dead center is equivalent to substantially 72° of crank rotation in a conventionally cranked internal combustion engine.

\* \* \* \* \*